Nov. 13, 1934. Y. L. J. POTTIER 1,980,633
WIND SCREEN ENSURING DIRECT VISION THROUGH THE AIR
Filed April 16, 1930
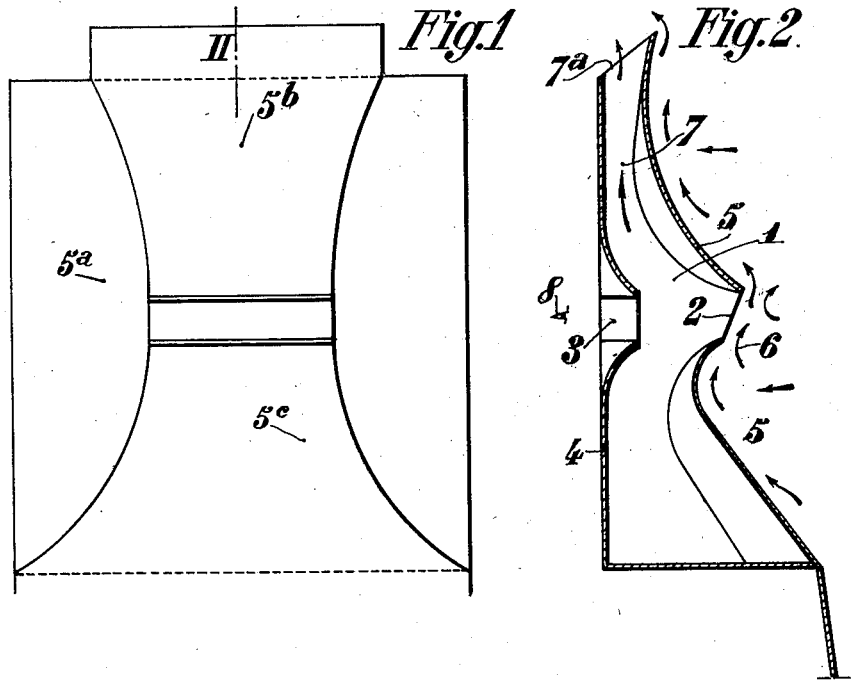
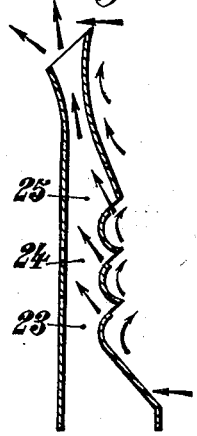

Patented Nov. 13, 1934

1,980,633

UNITED STATES PATENT OFFICE 1,980,633

WIND-SCREEN ENSURING DIRECT VISION THROUGH THE AIR

Yves Léon Jacques Pottier, Paris, France

Application April 16, 1930, Serial No. 444,814
In France July 25, 1929

1 Claim. (Cl. 296—84)

Wind-screens actually used comprise a transparent protecting screen on which rain, snow, dust, grease, or other substances accumulate and thus materially diminish the visibility through this screen.

In order to remedy these inconveniences, use is actually made of glass wiping devices, the displacements of which in front of the eyes of the driver considerably incommode the latter.

The present invention, which has for object to remedy the above mentioned inconveniences, relates to a wind-screen ensuring direct vision through the air, for all applications to land, nautical or aerial vehicles, and in which no transparent solid medium is placed in the field of observation.

This wind-screen is mainly characterized in that it comprises means for stopping or deflecting air streams and preventing them from reaching the observer's eye, through at least one observation port or space.

The above mentioned feature can give rise to numerous forms of construction which are obviously all included in the scope of the present invention and which can differ from each other:— either by the shape and the constitution of the wall in which is provided the observation port; this wall can be constituted: (a) by a removable device arranged opposite the driver of the vehicle and which is fitted in an ordinary wind-screen; (b) by an improved wind-screen in accordance with the invention and which can be arranged at the place and stead of an ordinary wind-screen; (c) by one of the walls of the cock-pit of the driver or pilot of a vehicle, this cock-pit being devised according to the invention and having, for that purpose, means allowing direct vision through at least one observation port.

The wall or screen in which is provided the observation port or opening, can be made of any suitable opaque, translucent or transparent material:—or by the shape, arrangement and number of the observation openings; these openings vary according to the various forms of realization adopted;—or by the means for stopping or deflecting the air streams and preventing them from reaching the observer's eye through the observation opening or space; these means which are extremely variable, are particularly constituted: (a) by walls suitably arranged about the observation opening or partially in front of the latter and which act as deflectors avoiding the introduction of the air through the observation opening; (b) by the creation of sheets of air transverse to the direction of observation; these transverse air sheets being obtained naturally or mechanically; (c) by the combination of the means indicated in a and b.

A form of construction of a wind-screen ensuring direct vision through the air, in accordance with the invention, is mainly characterized in that the space, through which direct vision is obtained and which is included between two walls provided with observation openings, has, at its front part, suitably orientated walls, acting as deflectors, and which limit the entrance of air in the observation space wherein opens a suction pipe line creating a sheet of air transverse to the direction of observation and which prevents any air stream from reaching the observer's eye.

The accompanying drawing illustrates, by way of example only, several forms of construction of improved wind-screen in accordance with the invention.

Fig. 1 is a front view of a first form.

Fig. 2 is a section made according to line II—II of Fig. 1.

Fig. 3 is an axial section of a constructional modification.

In the form of construction illustrated in Figs. 1 and 2, the observation space is limited by openings 2 and 3 respectively provided, the first, in a front wall 5, and the second in a rear wall 4.

The front wall 5 has side slopes 5$^a$ and upper and lower median deflectors 5$^b$ and 5$^c$ respectively, which create air streams indicated by arrows in Fig. 2 and an eddying zone at 6, in front of the opening 2. A channel or space 7 is provided between the walls 4 and 5. The upper part 7$^a$ of this channel is so arranged that the relative wind creates a partial vacuum at the upper part of the said channel and ensures the formation of a transverse sheet or stream, which avoids the introduction of air at 8, where is placed the observer's eye. This sheet or stream also drives away the air which might enter the space 1 through the opening 2. It is obvious that the lower part might be provided with a similar device. A forced draught might be provided at 7$^a$ and obtained through the medium of a static or like suction apparatus, or by causing the portion 7$^a$ to communicate with any suitable vacuum device, and particularly, at the air intake under the furnace, in case the wind-screen in accordance with the invention is used on a locomotive.

Fig. 3 shows a modification with several openings 23, 24 and 25. The operation of this device is identical to that indicated for the first form of construction. It clearly appears from the foregoing that the most important advantage of the invention resides in the fact that any transparent wall liable to be soiled and rendered opaque by the dust contained in the air, can be eliminated. But it is obvious that a transparent wall, placed behind the observation opening, will not be soiled and will be always clean. This wall can belong to an optical system (periscope for instance) allowing indirect vision or the representation of any field of observation on a screen. Such an arrangement, which can present numerous advantages, is obviously included in the scope of the invention.

It is obvious that the forms of construction described and illustrated are only simple examples, capable of receiving modifications, as well in the constitution of the various elements as in the relative arrangement of the latter. All modifications which do not alter in any way the main features above set forth and the object sought for, are included in the scope of the invention.

What I claim as my invention and desire to secure by Letters Patent, is:

In a wind-shield for vehicles, a rear wall having an observation opening therein, upper and lower front walls arranged to provide an observation opening therebetween, the second mentioned opening being situated in front of and opposite the first mentioned opening, lateral walls connecting the front walls to the rear wall and forming therewith a channel in vacuo extending from the upper part of the upper front wall and to the observation openings, the lower front wall being concaved for effecting under the relative action of the wind in front of the second mentioned opening and transversely thereto a deflection of the air, the streams of air passing in front of the second opening escaping over the upper front wall and preventing the admission of air through the second mentioned opening.

YVES LÉON JACQUES POTTIER.